United States Patent [19]

Levinson et al.

[11] Patent Number: 4,478,531
[45] Date of Patent: Oct. 23, 1984

[54] RACK AND PINION BALL JOINT ASSEMBLY

[75] Inventors: Dale A. Levinson, Hazelwood; Leonard R. Ketterer, Pacific, both of Mo.

[73] Assignee: Moog Automotive, Inc., St. Louis, Mo.

[21] Appl. No.: 433,776

[22] Filed: Oct. 12, 1982

[51] Int. Cl.³ .............................................. F16C 11/06
[52] U.S. Cl. ..................... 403/77; 403/132; 403/133; 403/122; 280/96
[58] Field of Search ............... 403/77, 132, 133, 135, 403/137, 138, 144, 122; 280/96, 674, 180, 148, 95 R, 96.1

[56]         References Cited
        U.S. PATENT DOCUMENTS

| 2,876,029 | 3/1959 | Latzen | 403/133 |
| 3,226,141 | 12/1965 | Sullivan | 403/135 |
| 3,958,411 | 5/1976 | Bernt | 29/522 X |
| 4,203,683 | 5/1980 | Rogers | 403/132 |

FOREIGN PATENT DOCUMENTS

| 1394509 | 5/1975 | United Kingdom | 403/132 |
| 1570499 | 7/1980 | United Kingdom | 403/135 |

*Primary Examiner*—Cornelius J. Husar
*Assistant Examiner*—Joseph A. Fichetti
*Attorney, Agent, or Firm*—Gravely, Lieder & Woodruff

[57]         ABSTRACT

Tie rod ball joint end connection for a vehicle rack and pinion steering system in which the ball joint end connection is characterized by the housing having a bearing surface in one open end to receive the ball head of the tie rod, a threaded opposite end and deformable means positionable in the housing from the threaded end for exerting a preliminary pre-load on the ball head suitable for establishing the initial assembly thereof, and for transmitting to the ball head the final pre-load when the rack is threaded into the threaded end.

5 Claims, 9 Drawing Figures

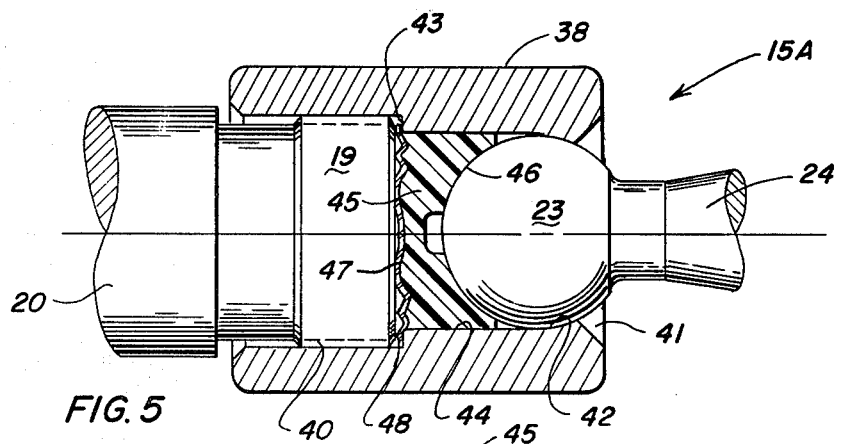
FIG. 5
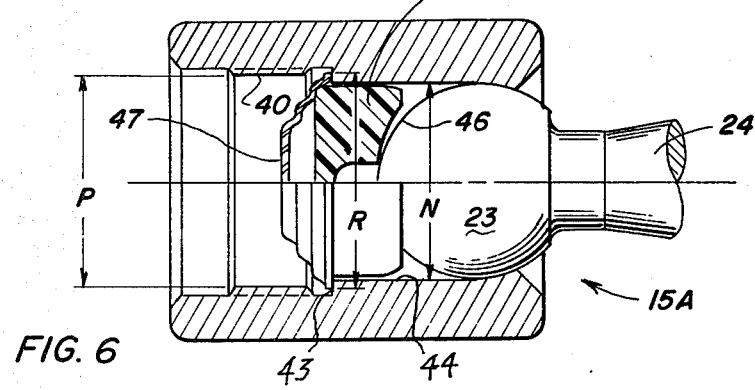
FIG. 6
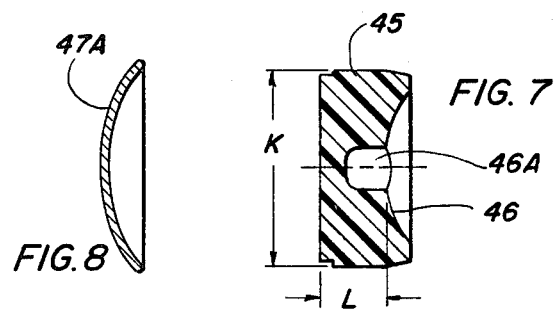
FIG. 7
FIG. 8
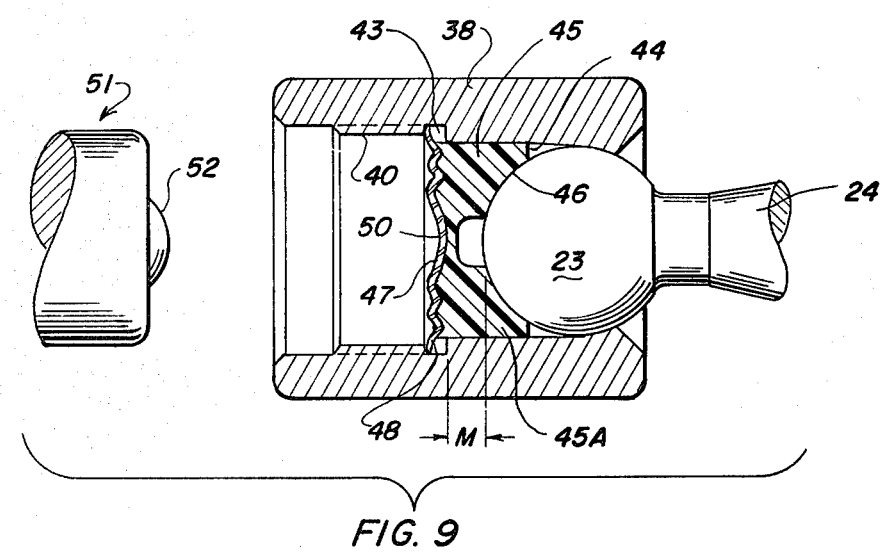
FIG. 9

RACK AND PINION BALL JOINT ASSEMBLY

BACKGROUND OF THE INVENTION

1. Field of the Invention

This invention relates to ball joint assemblies useful at the inner end of the tie rod in a rack and pinion steering system for a vehicle.

2. Description of the Prior Art

It is known that rack and pinion steering systems employ ball joints between the rack and the tie rods in order to provide the necessary universal motion during wheel steering response. Examples of pertinent prior art include Wood U.S. Pat. No. 3,693,999 of Sept. 26, 1972; Adams U.S. Pat. No. 3,834,727 of Sept. 10, 1974; Bourdon U.S. Pat. No. 3,849,009 of Nov. 19, 1974; Wood U.S. Pat. No. 3,950,006 of Apr. 13, 1976; and Zukowski U.S. Pat. No. 4,187,033 of Feb. 5, 1980.

The problems with the foregoing prior art are numerous: such as full pre-loading of the ball joint before it is mounted on the rack which allows age hardening of the plastic material when allowed to have a long shelf life, and such as the expensive construction of the components having many parts which are difficult to assemble and obtain pre-load on a consistent basis before crimping the assembly before mounting on the rack.

SUMMARY OF THE INVENTION

The present invention provides a novel preinstallation assurance that the tie rod ball joint has been correctly put together before being packaged by the creation of a preliminary pre-load on the ball head which does not require any type of securement, such as staking which is commonly employed.

It is an object of the present invention to provide a tie rod ball joint assembly with a few parts which become retained in assembly under a preliminary pre-load on the ball head such that the act of mounting the assembled ball joint on the end of the rack establishes the desired final load on the ball head.

In one embodiment of the present invention, the housing for receiving the ball head is formed with fixed means to retain a deformable element in position to establish a pre-load in advance of the final load generated by mounting the ball joint on the rack thereby undergoing further deformation.

In another embodiment of the present invention the housing for receiving the ball head is formed with fixed means for retaining deformable means in position to exert a preliminary pre-load on the ball head and to generate the final load upon assembly on the rack by undergoing further deformation.

A ball joint for use in a rack and pinion steering system for the steerable wheels of a vehicle in which the ball joint connects the threaded end of the rack with a tie rod, said ball joint comprising: a steering force transmitting head connected to one end of the tie rod; a housing having an open internally threaded end and an opposite open end adjacent an internal bearing seat to receive said force transmitting head with the tie rod projecting through the opposite open end; and a deformable means positionable in said housing through said open internally threaded end, said deformable means having a first position relative to said force transmitting head for exerting a preliminary pre-load thereon, and said deformable means being responsive to the threaded mounting of said housing on the threaded rack end for exerting a substantial final load on the force transmitting headed end.

BRIEF DESCRIPTION OF THE DRAWINGS

The principal features of the embodiments of the present invention have been shown in the following drawings, wherein:

FIG. 5 is a fragmentary sectional view of another embodiment of a ball joint assembly on the end of a rack for a rack and pinion steering mechanism;

FIG. 6 is a fragmentary sectional view of the ball joint of FIG. 5 in its unstressed pre-assembled condition;

FIG. 7 is a sectional view of an elastomeric element for the assembly of FIG. 5 in its pre-assembled relaxed condition;

FIG. 8 is a sectional view of a retainer as an alternate for the corrugated retainer seen in FIG. 6; and FIG. 9 is a fragmentary sectional view of the ball joint assembly in a pre-installation condition with the retainer fully collapsed.

DESCRIPTION OF THE PREFERRED EMBODIMENTS

Figure 1:
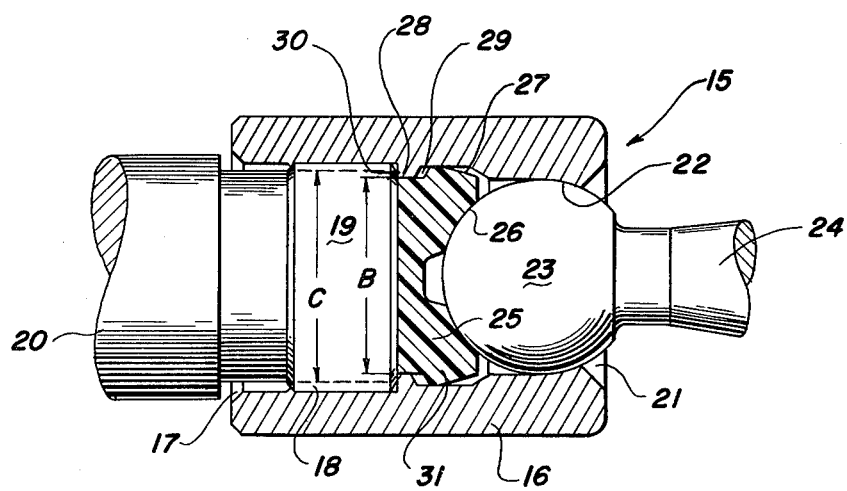
FIG. 1 is a fragmentary sectional view of one embodiment of a tie rod end and ball joint assembly on the end of the rack for a rack and pinion steering mechanism.

With reference to FIG. 1, the ball joint assembly 15 comprises a housing 16 having an open end 17 which is provided with internal threads 18 for the reception of the threaded end 19 of rack 20 which is the movable part of a rack and pinion power steering system of known construction and which it is not believed necessary to illustrate. The housing 16 is formed with an opposite open end 21 and an adjacent bearing seat surface 22 for the reception of the headed end 23 which is connected to and is shown to be an integral part of tie rod 24, although the head 23 may be separately formed and suitably attached to the tie rod 24. There is a pre-load exerting element 25 which may be formed of a suitable elastomeric material disposed between the head 23 and the threaded end 19 of the rack 20. The element 25 forms a bearing seat 26 for the head 23 and it is forcibly compressed into the annular space 27 in the housing 16 below an annular rib 28 which forms an inwardly directed shoulder 29 as well as an outwardly directed shoulder 30 on its opposite surface.

In the manufacture of the housing 16 and the bearing 25 certain characteristics and dimensions need to be observed. The formation of housing 16 is characterized by having an internal annular space 27 adjacent the bearing seat 22 with a diameter A, a fixed rib 28 having an inner diameter B which is smaller than the minor diameter C for the threads 18. When the ball head 23 is in contact with seat 22, its crown is spaced by a dimension D from the shoulder 30 on the rib 28, and the crown of the ball head 23 is also below the base of the shoulder 29 by a dimension E. The element 25 (FIG. 2)

has a body with diameter F which is less than the inner diameter B for the rib 28. The large diameter G of element 25 is larger than the inner diameter B for the fixed rib 28. Other characteristics of element 25 include the dimension H which is greater than dimension D in the housing which is related to the position of the crown or top of the ball head 23. The element 25 is formed with an annular projection 31 which establishes the dimension G which is greater than the inner diameter B of fixed rib 28 so the shoulder 29 will retain the element 25. In effect the projection 31 is a retainer for the loading means 25. It is important to the proper cooperation of the housing 16 and element 25 to control the dimensions D and H, and dimensions J and E to provide the proper pre-load range during manufacture and upon installation in a steering system. Dimensions A and G need to be controlled for proper volume of the element 25. Cp The ball joint assembly as seen in FIG. 1 is made up of essentially three components which include the housing 16, the head 23 on the tie rod 24 and the deformable element 25 which is operably detained in the housing 16 in view of the position of the annular enlargement 31 being captured in the space 27 by the rib 28. The threaded end 19 of the rack 20 is not considered to be a part of the ball joint per se.

Figure 2:
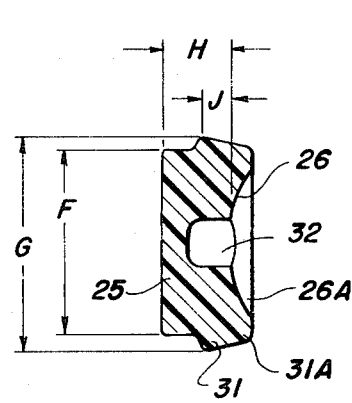
FIG. 2 is a sectional view of an elastomeric element of the assembly in FIG. 1 in its relaxed pre-assembled condition.
Figure 3:
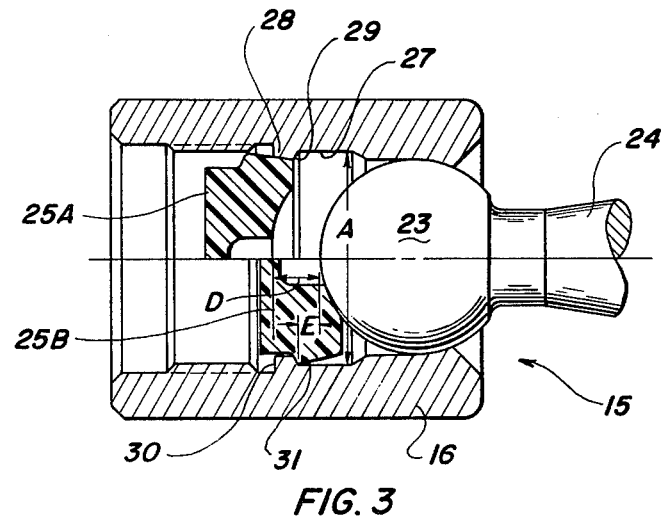
FIG. 3 is a sectional view of the ball joint housing with the elastomeric element shown in split section to show a before installation and after installation thereof.

Looking now at FIGS. 2 and 3, the ball joint 15 is shown with a portion of the deformable element 25A in an initial position within the threaded portion of the housing 16, and with a deformable portion 25B captured in the space 27 (FIG. 3) by reason of the annular enlargement portion 31 being located under the surface 29 on rib 28. It is believed that showing the deformable element 25 in its initial position 25A and in its initial pre-load position 25B will greatly improve the understanding of a feature of the present invention. FIG. 2 illustrates the deformable element 25 in its relaxed position to show a bearing seat portion 26 prior to engaging on the crown surface of the ball head 23 and with the circumferentially enlarged portion 31 in its undeformed state in which the surface 31A is at an angle relative to the flat surface 26A surrounding the seat surface 26. A small cavity 32 is provided centrally of the element 25 so as to render the body thereof sufficiently deformable to accomplish the two-stage loading effect it will have on the head 23. The cavity 32 also retains grease.

Figure 4:
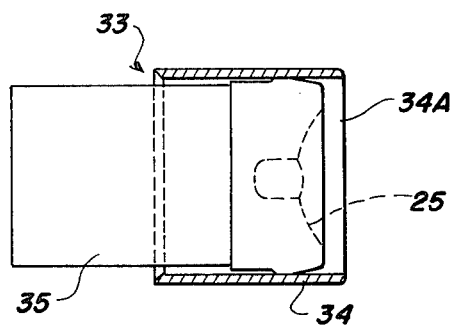
FIG. 4 is a fragmentary sectional view of a tool by which the element of FIG. 2 may be inserted in the ball joint housing of FIG. 1.

FIG. 4 illustrates an assembly tool 33 which is made up of a cylindrical sleeve 34 into which the deformable element 25 is placed so as to facilitate disposition of the element 25 into the housing 16 to assume the position shown at 25B in FIG. 3. The tool 33 also includes a ram or pushing bar 35 which sets inside the sleeve 34 and pushes the element 25 into its preliminary pre-load position. The inner end 34A of the sleeve 34 is adapted to abut the surface 30 on the annular rib 28 so as to stop its inward progress and permit the ram 35 to push the element 25 into its intended position.

By comparing FIGS. 1 and 3 it can be seen that in FIG. 3 element 25, when in the position of 25B, will have changed its physical shape by enlarging the engaging area of the bearing seat 26 on the head 23, whereas in FIG. 1 when the threaded end 19 of the rack 20 is threaded into the housing 16 and is in abutment with the shoulder surface 30 on the annular rib 28 the bearing seat 26 has increased its surface contact with the head 23, the centrally located cavity 32 as seen in FIG. 2 has been substantially reduced, and the annular surface 31A of the annular projection 31 has increased its area of contact in the cavity 27. All of these changes in the physical configuration of the element 25 as shown in FIG. 1 will have established a final load on the head 23, the effect of which is to accommodate wear in any of the working surfaces between the head 23 and the housing 16 so that the element 25 will gradually recover from its deformed state and continue to exert a load on the head 23.

A second embodiment 15A of the present invention is shown in FIG. 5 wherein the tie rod 24 with its head 23 is mounted in a modified housing 38 which has an open end with internal threads 40 at one end and with an opposite open end 41 and an annular seat surface 42 adjacent the open end 41 for receiving the head 23. The internal threads 40 in the housing 38 terminate so as to be spaced from a shoulder 43 which is located at the zone where the passage in the housing 38 for receiving the headed end 23 is reduced in diameter as at 44. The assembly includes a deformable element 45 which is formed with a seat surface 46 presented to the head 23 and with its opposite surface engaged by a deformable element 47 which has its annular margin or projection 48 engaged on the shoulder 43 when the threaded end 19 of the rack 20 is threaded into position in housing 38 so as to drive the deformable element 47 against the first mentioned deformable element 45 so that the head 23 will be loaded to the extent desired for constantly taking up wear during the service life of the ball joint assembly 15A.

Turning now to FIG. 6, there is shown the ball joint assembly 15A in a preliminary state of assembly in which the initial deformable element 45 and the second mentioned deformable element 47 are more or less in an unstressed state while resting within the housing 38 in a loose preliminary assembly. In order to establish an initial pre-load on the head end 23 reference will now be made to FIG. 9 where it is seen that the second deformable element 47 has been deformed by the formation of a concave dimple 50 in its central area which forces the peripheral margin 48 to expand into the space between the end of the threads 40 and the shoulder 43, thereby capturing the peripheral portion of the element 47 under the inner end of the threads 40 for effectively retaining the deformable elements in preliminary pre-load on the headed end 23. Simultaneously, the deformable element 45 will be pressed against the head 23 to increase the bearing surface contact 46 thereon and to force the peripheral surface 45A against the cylindrical surface 44 in the housing 38. The deformation of element 47 from its physical relaxed state in FIG. 6 to its initial deformed state as shown in FIG. 9 is accomplished by the use of a tool 51 which is formed with a convex lead end 52 which engages the central area of the element 47 and forces it into the concave dimple configuration 50 seen in FIG. 9.

The relaxed physical configuration of element 45 can be seen in FIG. 7 in which the bearing seat surface 46 is formed with a central cavity 46A which will permit the material of the element 45 to assume the deformed position illustrated in FIG. 5. The physical characteristics of the element 45 and housing 38 are such that the unstressed diameter K of element 45 is less than the internal diameter N of the housing 38, and the free state diameter R of the deformable element 47 is greater than the diameter N but less than the minor thread diameter P. Also the dimension L of element 45 and dimension M (FIG. 9) are critical and need to be controlled to provide the proper load range when the assembly is installed in the steering system. When the tool 51 is used to form dimple 50 in element 47, the diameter R thereof increases so it is captured between the end of the threads 40 and housing shoulder 43, and exerts a preload on element 45 and ball head 23.

The deformable element 47 of FIG. 6 is shaped with a number of corrugations which will permit the element to be forced into or squashed to a substantially flat configuration which progresses from a preliminary flattened shape in FIG. 9 to the eventual final more severely flattened configuration seen in FIG. 5. The element 47 is formed of very soft material which will permit its simultaneous deformation into a flat position with an increase in its circumferential dimension R so that it will finally reach a fully captured position in housing 38 between the inner ends of threads 40 and the shoulder 43.

While the deformable element 47 has been illustrated in its operative position in FIGS. 5, 6 and 9, an equivalent element 47A is illustrated in FIG. 8 and is in the form of a concavo-convex washer which will function in substantially the same fashion as has been described above for the element 47.

The foregoing specification is directed to presently disclosed embodiments of the invention, but it should be understood that modifications may come to mind once the scope of the disclosure is understood.

What is claimed is:

1. The arrangement of a ball joint assembly prior to incorporation in a rack and pinion vehicle steering system which comprises:
   (a) a housing having a first open end and an adjacent internal bearing seat, a first fixed surface forming a circumferentially extending and radially inwardly directed shoulder in the housing spaced axially along said housing from said bearing seat, and internal threads extending inwardly from a second open end to an inner end thread such that said inner end thread provides a second circumferentially extending and radially inwardly directed fixed shoulder;
   (b) a tie rod headed end seated on said internal bearing seat and spaced from said first and second fixed surfaces; and
   (c) tie rod headed end retaining means for holding said headed end on said internal bearing seat, said retaining means being deformable and presenting a further bearing surface to engage on said tie rod headed end and having a radially and circumferentially extending projection engaged on one of said first and second shoulders for holding said retainer means on said tie rod headed end against said internal bearing seat.

2. The ball joint assembly set forth in claim 1 wherein said deformable retainer engages on said first fixed shoulder.

3. The ball joint assembly set forth in claim 1 wherein said deformable retainer engages on said second fixed shoulder.

4. A ball joint for use in a rack and pinion steering system for the steerable wheels of a vehicle in which the ball joint connects the threaded end of the rack with a tie rod, said ball joint comprising:
   (a) a steering force transmitting head connected to one end of the tie rod;
   (b) a housing having an open internally threaded end and an opposite open end adjacent an internal first bearing seat inwardly of said opposite open end to receive said force transmitting head with the tie rod projecting outwardly through the opposite open end, and said housing being formed with a fixed rib extending circumferentially about said housing interior and providing internal surfaces spaced from said internal first bearing seat; and
   (c) a deformable means positionable in said housing through said open internally threaded end, and said deformable means presenting a second bearing seat to said force transmitting head and being formed with a circumferentially extending projection adapted to be forced over said fixed rib and engage a surface of said rib in a first position relative to said force transmitting head for exerting a preliminary pre-load retaining contact on said force transmitting head opposite to said first bearing seat, and said deformable means being exposed to and being responsive to the threaded mounting of said housing on the threaded end of the rack to utilize the end of the rack for exerting a substantial final load on the force transmitting headed end to force it against said first bearing seat.

5. In a rack and pinion steering system for the steerable wheels of a vehicle in which the threaded ends of the rack are connected by tie rods to the wheels, at least one ball joint means connecting one of the threaded ends of the rack to a tie rod, comprising:
   (a) a housing formed in one open end with a first bearing surface surrounding the interior of said housing adjacent said one open end, said housing having an opposite open end;
   (b) threads formed in said housing and spaced from said opposite open end, said threads being positionable to be engaged by the threaded end of a rack;
   (c) a tie rod headed end received in said housing through said opposite open end and seated on said first bearing surface, said headed end being on the tie rod which extends outwardly of said one open end of said housing; and
   (d) means in said housing for exerting a preliminary retaining contact on said headed end including a deformable element engaged on said headed end and forming a second bearing surface opposite to said first bearing surface, and means cooperating between said deformable element and the interior of said housing including a fixed rib on said housing interior extending circumferentially about the interior and a circumferentially extending shoulder on said deformable element adapted to engage on said fixed rib for retaining said deformable element in its preliminary retaining contact on said headed end, said housing opposite end being presented to receive the threaded end of the rack for engaging said deformable means to exert a final load on said headed end against said first bearing surface.

* * * * *